US012626138B2

(12) United States Patent
Si et al.

(10) Patent No.: US 12,626,138 B2
(45) Date of Patent: May 12, 2026

(54) CAUSALITY DETECTION FOR OUTLIER EVENTS IN TELEMETRY METRIC DATA

(71) Applicant: Palo Alto Networks, Inc., Santa Clara, CA (US)

(72) Inventors: Zhen Han Si, Milpitas, CA (US); Claudionor Jose Nunes Coelho, Jr., Redwood City, CA (US); Viswesh Ananthakrishnan, Palo Alto, CA (US); Eyal Firstenberg, Palo Alto, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 1277 days.

(21) Appl. No.: 17/447,542

(22) Filed: Sep. 13, 2021

(65) Prior Publication Data

US 2023/0080654 A1 Mar. 16, 2023

(51) Int. Cl.
*G06N 3/084* (2023.01)
*H04L 41/16* (2022.01)
*H04L 43/04* (2022.01)

(52) U.S. Cl.
CPC ............. *G06N 3/084* (2013.01); *H04L 41/16* (2013.01); *H04L 43/04* (2013.01)

(58) Field of Classification Search
CPC .............. G06F 11/079; H04L 63/1425; H04L 41/06314; H04L 41/16; H04L 43/04; G06N 3/084; G06N 3/0455
See application file for complete search history.

(56) References Cited

U.S. PATENT DOCUMENTS

| | | | | |
|---|---|---|---|---|
| 10,902,062 | B1 * | 1/2021 | Guha | ................... G06F 16/9027 |
| 11,374,952 | B1 * | 6/2022 | Coskun | ................... G06N 3/045 |
| 11,422,882 | B1 * | 8/2022 | Chhabra | ............... G06F 11/327 |
| 11,531,863 | B1 * | 12/2022 | Zweig | .................... G06N 3/045 |
| 2017/0034721 | A1 * | 2/2017 | Yang | ..................... H04W 24/08 |
| 2020/0064822 | A1 * | 2/2020 | Song | ................... G05B 23/0254 |
| 2021/0286614 | A1 * | 9/2021 | Nicolae | ................... H04L 67/10 |
| 2022/0303288 | A1 * | 9/2022 | Wang | ................... G06F 18/2113 |

(Continued)

OTHER PUBLICATIONS

Zhao et al., "Multivariate Time-series Anomaly Detection via Graph Attention Network," 2020 IEEE International Conference on Data Mining (ICDM) (Year: 2020).*

(Continued)

*Primary Examiner* — Miranda M Huang
*Assistant Examiner* — Yao David Huang
(74) *Attorney, Agent, or Firm* — Gilliam IP PLLC

(57) ABSTRACT

Identifying causal relationships between outlier telemetry events in telemetry metric data using machine learning ensembles of an autoencoder and an attention mechanism provides an automated framework for root cause analysis. Outlier telemetry events are detected across a cloud of telemetry events using unsupervised learning models. To establish a causal relationship between outlier telemetry events, autoencoder/attention mechanism ensembles are trained for pairs of telemetry metrics. When inputs of sequences of telemetry events of a first telemetry metric and a second telemetry metric to the ensemble have sufficiently high loss value, a causal relationship is inferred. Internal node values of the attention mechanism from the input identify specific time stamps for the first telemetry metric that have a causal relationship with the outlier telemetry event.

20 Claims, 9 Drawing Sheets

(56) References Cited

U.S. PATENT DOCUMENTS

| | | | |
|---|---|---|---|
| 2023/0039740 A1* | 2/2023 | Wang | G06N 3/0442 |
| 2025/0119443 A1* | 4/2025 | Mitani | G06F 11/079 |

OTHER PUBLICATIONS

Zhang et al., "LogAttn: Unsupervised Log Anomaly Detection with an AutoEncoder Based Attention Mechanism," in H. Qiu et al. (Eds.): KSEM 2021, LNAI 12817, pp. 222-235, 2021 (Year: 2021).*

Ramakrishnan, "An Alternative to the Correlation Coefficient That Works For Numeric and Categorical Variables", [online] retrieved on Jul. 21, 2022 from <https://rama100.github.io/lecture-notes/x2y.nb.html#:~:text=Unlike%20metrics%20like%20the%20correlation,come%20as%20a%20surprise%2C%20however>, Jun. 20, 2020.

Bello, et al., "Attention Augmented Convolutional Networks", IEEE Xplore, Computer Vision Foundation, retrieved on Feb. 22, 2021 from https://openaccess.thecvf.com/content_ICCV_2019/papers/Bello_Attention_Augmented_Convolutional_Networks_ICCV_2019_paper.pdf, 2019, pp. 3286-3295.

Vaswani, et al., "Attention is All You Need", 31st Conference on Neural Information Processing Systems, Long Beach, CA, retrieved on Feb. 23, 2021 from https://papers.nips.cc/paper/2017/file/3f5ee243547dee91fbd053c1c4a845aa-Paper.pdf, Jun. 2017, 15 pages.

Zhang, et al., "An Unsupervised Model with Attention Autoencoders for Question Retrieval", Association for the Advancement of Artificial Intelligence, The Thirty-Second AAAI Conference, Mar. 2018, pp. 4978-4986.

* cited by examiner

CAUSALITY DETECTION FOR OUTLIER EVENTS IN TELEMETRY METRIC DATA

BACKGROUND

The disclosure generally relates to the field of information security, and to modeling, design, simulation, or emulation.

Autoencoders are neural networks which, contrary to typical neural network architectures, comprise a first set of contractive layers that progressively decrease the number of internal nodes at each layer, then a second set of expansive layers that progressively increase the number of internal nodes at each layer until the output layer that is an equivalent length to the input layer. The loss function that guides training (e.g., via gradient descent with backpropagation through the layers) is a loss between the input and the output as opposed to a loss between outputs and labels for corresponding inputs for a supervised neural network. Once trained, the loss function for a trained autoencoder can be used for outlier detection. Input/output pairs that have loss above a threshold value indicate that the input tends to statistically deviate from the training data and can be identified as an outlier.

The use of attention mechanisms is a methodology in machine learning for isolating specific inputs to a neural network that have a significant impact on the output. The attention mechanism is itself a neural network comprising various layers including mask, softmax, scaling, alignment, and context operations. The attention mechanism is trained as an ensemble with the neural network so that inputs to the attention mechanism/neural network ensemble generate weights at internal nodes of the attention mechanism that indicate which parts of the input are significant for the output values.

BRIEF DESCRIPTION OF THE DRAWINGS

Embodiments of the disclosure may be better understood by referencing the accompanying drawings.

DESCRIPTION

Figure 1:
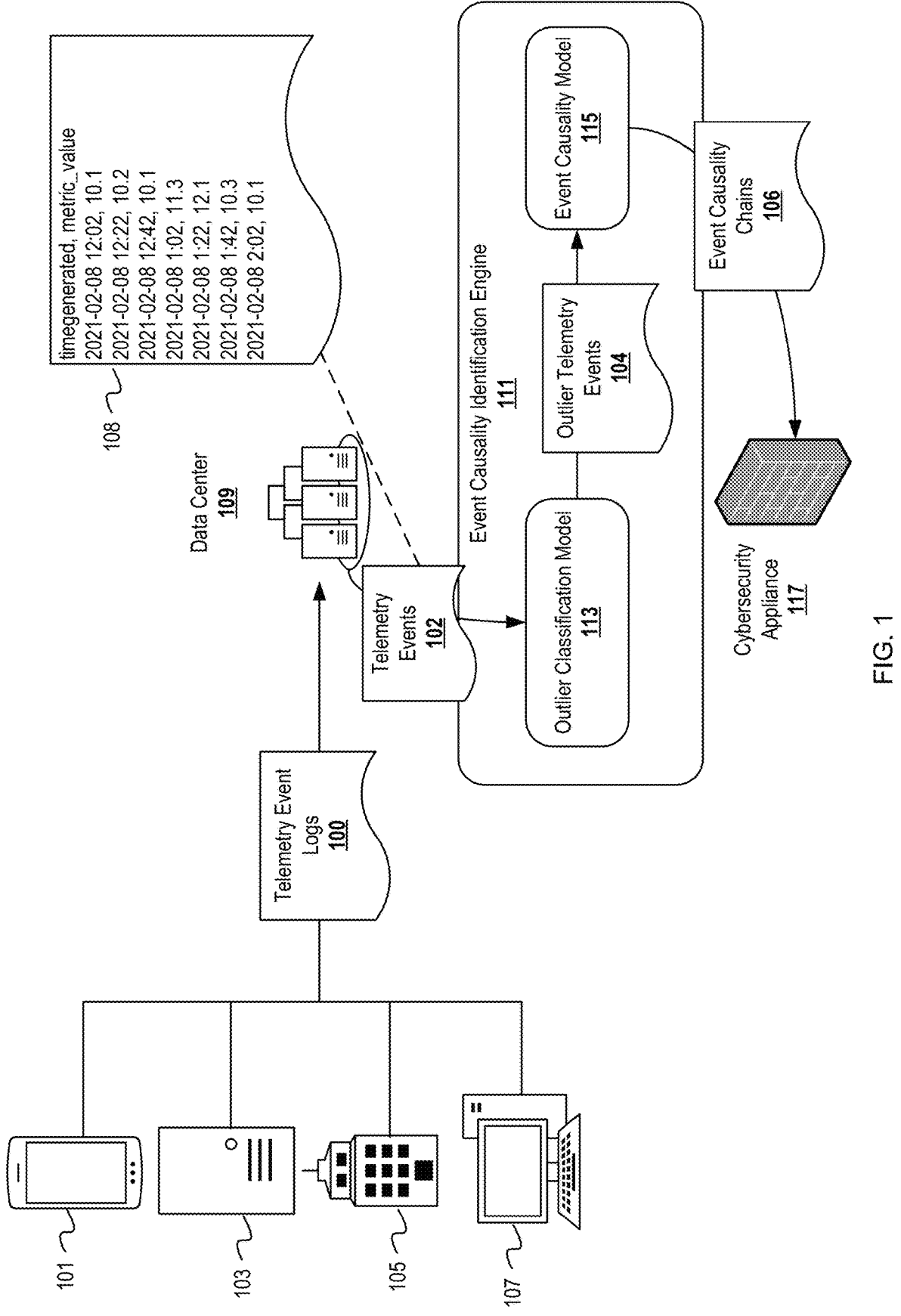
FIG. 1 is a schematic diagram of an example system for determining event causality chains in telemetry event logs across data sources.

The description that follows includes example systems, methods, techniques, and program flows that embody aspects of the disclosure. However, it is understood that this disclosure may be practiced without these specific details. For instance, this disclosure refers to identification of causality chains in telemetry metric data via attention mechanism/autoencoder ensembles in illustrative examples. Aspects of this disclosure can be instead applied to causality chain identification with ensembles of attention mechanisms and other unsupervised learning models. In other instances, well-known instruction instances, protocols, structures and techniques have not been shown in detail in order not to obfuscate the description.

Overview

Outlier detection and causal analysis for telemetry metrics across disparate devices, networks, programs, and other sources rely heavily on domain-level expertise. In order to perform both outlier detection and causal analysis for telemetry events and subsequently identify root causes for outlier telemetry events, an automated machine-learning framework is presented herein. A data center collects telemetry events logs across a cloud of sources. An event causality identification engine identifies telemetry metrics in the telemetry events and uses pretrained telemetry metric outlier models to detect outlier telemetry events.

After outlier telemetry event detection, the event causality identification engine deploys an event causality model to identify telemetry event causality chains. The event causality identification engine determines, for each detected outlier telemetry event, sets of candidate causal telemetry events that may have caused to the outlier telemetry event. An autoencoder/attention mechanism ensemble is trained on values for telemetry metrics for pairs of telemetry metrics to detect causal relationships between telemetry events across each pair of telemetry metrics. The attention mechanism/autoencoder ensemble is configured to identify specific events in each set of candidate cause telemetry events with a high likelihood of causality to the corresponding outlier telemetry event. The event causality identification engine then links pairs of telemetry events into event causality chains using causality detected by the autoencoder/attention mechanism ensemble to facilitate root cause analysis.

Terminology

The terms "event" and "telemetry event" are used interchangeably to refer to a telemetry metric value and a corresponding time stamp value for a telemetry metric. The telemetry metric can be a metric for a single endpoint device, a network of devices, a program running across devices, etc. The time stamps occur at predetermined time intervals that can vary based on the corresponding telemetry metric.

The phrase "causal" is used herein with respect to telemetry events to indicate that a first telemetry event has an influence on the occurrence of a second telemetry event at a later time stamp. The mechanism of influence depends on the types of telemetry events such as device health and performance and program performance and can further depend on malicious attackers, network protocols, etc. across a single endpoint or multiple endpoints communicatively coupled. To exemplify, a process running on a first endpoint can launch another process on a second endpoint causing excessive computer processing unit (CPU) usage at the second endpoint. A telemetry event related to the process running on the first endpoint is thus causal to a telemetry event for CPU usage on the second endpoint. A "cause event" is a telemetry event that is causal to another telemetry event with a later time stamp. A "causal event" is a telemetry event that was at least partly caused by a cause event.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

FIG. 1 is a schematic diagram of an example system for determining event causality chains in telemetry event logs across data sources. Data sources 101, 103, 105, and 107 transmit telemetry event logs 100 to a data center 109 at predetermined time intervals. The data center 109 stores the telemetry event logs 100 and identifies telemetry events 102 that it communicates to an event causality identification engine 111. The event causality identification engine 111 comprises an outlier classification model 113 that identifies outlier telemetry events 104 in the telemetry events 102. An event causality model 115 determines event causality chains 106 in the outlier telemetry events 104 that it communicates to a cybersecurity appliance 117.

The data sources 101, 103, 105, and 107 comprise a mobile device 101, a server 103, a home or corporate network 105 comprising physically dispersed devices, and a personal computer 107. These are example data sources and the data sources 101, 103, 105, and 107 can be any data sources communicatively coupled to the data center 109 (or an intermediary) that collect telemetry events. The telemetry event logs 100 can comprise information related to device performance, session data, data and/or control plane logs, security policy information, and/or any data or metadata related to device performance, device health, threat prevention, product usage, etc. As such the telemetry event logs 100 can be aggregated across a single device (e.g., for device performance and health) or multiple devices (e.g., for a set of devices associated with a single firewall) prior to communication to the data center 109. The telemetry event logs 100 can be aggregated by a cybersecurity device or program that monitors devices across a network. For instance, the data sources 101, 103, 105, and 107 can comprise one or more cloud storage or cloud computing interfaces that can aggregate data across a cloud to add to the telemetry event logs 100.

The data center 109 can determine any number of metrics to extract from the telemetry event logs 100 and include in the telemetry events 102 such as device health and performance metrics, threat prevention metrics, product usage metrics, etc. For instance, device health metrics can comprise central processing unit (CPU) utilization and memory utilization statistics at a device or combination of devices. Product usage metrics can comprise security policies. Threat prevention metrics can comprise domain name system (DNS) related threat logs. As such, the source of telemetry event logs 100 can vary depending on the type of metric. Device health metrics can be collected from data on individual devices, product usage metrics can be collected from data across devices running a same product, and threat prevention metrics can be collected from a cybersecurity product that may be running on one or more devices or may be running on top of a network architecture by intercepting network traffic.

An example set of telemetry events 108 in the telemetry events 102 includes the following fields and field values: timegenerated, metric_value
2021-02-08 12:02, 10.1
2021-02-08 12:22, 10.2

2021-02-08 12:42, 10.1
2021-02-08 1:02, 11.3
2021-02-08 1:22, 12.1
2021-02-08 1:42, 10.3
2021-02-08 2:02, 10.1

The first field timegenerated indicates a time stamp at which a corresponding metric value was generated on a device or combination of devices and the second field metric_value represents a value for a telemetry metric at the corresponding time stamp. The time stamps and, therefore, corresponding event logs in the telemetry event logs 100 used to generate the example telemetry event set 108 are collected at even time intervals of 20 minutes. Different time intervals such as every minute, every 5 minutes, every hour, etc. can be used depending on the type and severity of the telemetry metric. For instance, a telemetry metric related to malware identification can have higher severity than a telemetry metric related to fan speed measurements and can be collected at a higher frequency. In the example telemetry event set 108, the metric value stays within a consistent range between 10.1 and 10.3 until a spike occurs at times 1:02 and 1:22 to a maximal metric value of 12.1. In some instances where the telemetry metric is typically consistent (e.g., fan speed), this could indicate an abnormality in related devices, whereas for some telemetry metrics spikes can be expected at specific time intervals such as times of day (e.g., server usage metrics).

The outlier classification model 113 can be any supervised or unsupervised learning model trained to detect outliers in data for a telemetry metric. Although depicted as a single classification model, the outlier classification model 113 can be a classification model for each of the telemetry metrics found in the telemetry event logs 100. The outlier classification model 113 can be updated with the telemetry events 102 as it is received to improve accuracy of classification. For instance, when the outlier classification model 113 is an unsupervised clustering algorithm, the telemetry events 102 can be used to update the cluster centers (e.g., with k-means clustering). When the outlier classification model 113 is a neural network or an autoencoder, the telemetry events 102 can be added to a set of training data and the outlier classification model can be periodically retrained or trained on additional data in batches as it is received.

The resulting outlier telemetry events 104 comprises telemetry events in the telemetry events 102 determined to be outliers. To exemplify, assume that the outlier classification model 113 is an autoencoder. The autoencoder is thus a neural network that is trained so that the output is as close to the input as possible according to a loss function (e.g., Euclidean norm between input and output vectors). Each input will be a telemetry event that indicates a telemetry metric value and corresponding time stamp. To illustrate, assume an input to the autoencoder is X[t] and the output is X'[t], and that the autoencoder minimizes an error $l(X[t], X'[t])$. Then, the autoencoder will learn a threshold error value $\varepsilon$ such that all telemetric metric value/time stamp pairs X[t] with $l(X[t], X'[t]) > \varepsilon$ are classified as outliers.

The event causality model 115 comprises a model trained to detect causality chains between outliers identified in the outlier telemetry events 104. For instance, the event causality model 115 can be an autoencoder using an attention mechanism to preprocess inputs comprising pairs of events that are candidates for causality chains. The event causality model 115 can determine that a sequence of events, $X[t-h:t-1] = (X[t-h], X[t-h+1], \ldots, X[t-1])$, for a telemetry metric at times $t-h$ to $t-1$ has the potential to be causal to a second telemetry metric Y[t] at time t as well as intervening events (Y[t−h], . . . , Y[t−1]) over a same time window. X[t−h] can be an outlier event while the intermediate events for X and Y can be normal (i.e., non-outlier) events. The event causality model 115 can receive the telemetry events 102 along with indications of which of the telemetry events 102 are outliers so as to retrieve all of the intermediate events. An autoencoder using an attention mechanism to determine any causality between events X[t−h: t−1] and events Y[t−h:t] is described in greater detail with respect to FIG. 3. The event causality model 115 can iterate, for a fixed outlier event Y[t], through all outlier events occurring prior to time stamp t for a different telemetry metric to determine potential causality while also accounting for intermediate events as described above. In some embodiments, less events than the total number of outlier events prior to time t can be analyzed. For instance, events for metrics known to have no bearing on telemetry metric Y can be skipped for causality analysis.

Once the event causality model 115 determines all events in the outlier telemetry events 104 (or in intermediate events proximate to outlier events) it aggregates events determined to be causal into event causality chains 106. In some embodiments, multiple events having sequential time stamps can be causal to subsequent events in a chain of causality. The cybersecurity appliance 117 receives the event chains in the event causality chains 106. These event causality chains 106 can be used, for instance, for root cause analysis for abnormalities across telemetry metrics. To exemplify, a spike in CPU usage can be linked to a specific process running on an endpoint device or an increase in traffic. The cybersecurity appliance 117 can identify and terminate the process and can perform threat analysis of a corresponding attack to prevent future errant processes. The cybersecurity appliance 117 can be any cybersecurity component across the data or control plane that monitors telemetry events. Instead of a standalone or separate cybersecurity appliance, a visualization component or monitoring component of the cybersecurity program that includes the event causality identification engine 111 can consume generated event causality chains.

Figure 2:
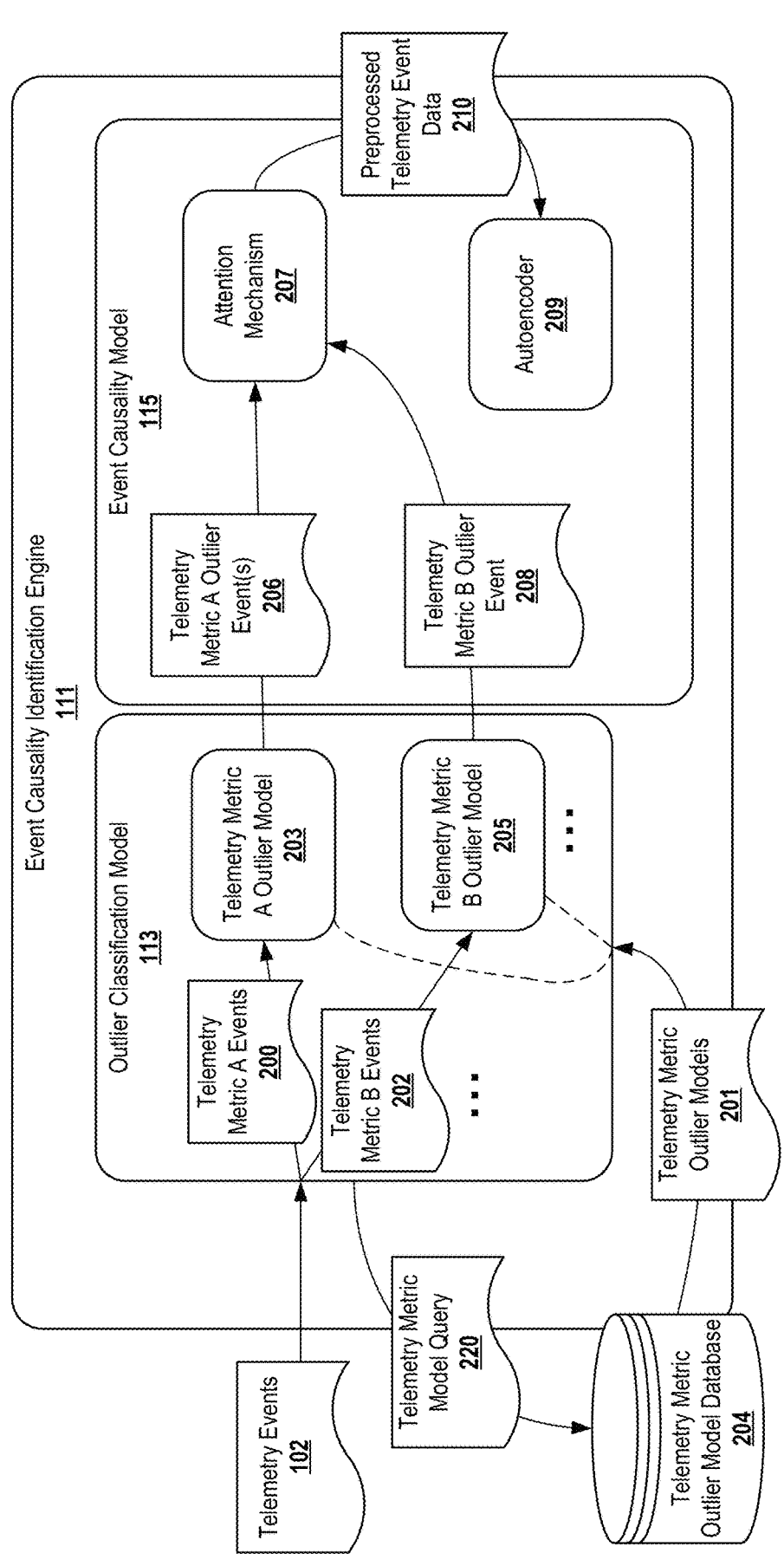
FIG. 2 is a schematic diagram of a system for identifying event causalities in telemetry events.

FIG. 2 is a schematic diagram of a system for identifying event causalities in telemetry metric data. FIG. 2 elaborates on the event causality identification engine 111 depicted in FIG. 1. The event causality identification engine 111 receives the telemetry events 102 and processes it with the outlier classification model 113 and event causality model 115 previously introduced. The outlier classification model 113 identifies the telemetric metrics indicated in the telemetry events 102 and generates a telemetry metric model query 220 indicating the identified telemetry metrics. A telemetry metric outlier model database 204 receives the telemetry metric model query 220 and accordingly retrieves telemetry metric outlier models 201 including telemetry metric A outlier model 203 and telemetry metric B outlier model 205 corresponding to telemetry metrics indicated in the telemetry metric model query 220. The telemetry metric outlier models 201 are trained on past telemetry metric data for the corresponding telemetry metric. For instance, the telemetry metric outlier models 201 can be autoencoders trained to replicate telemetry event inputs for a corresponding telemetry metric and classify as outliers those events that have a replication error above an error threshold.

The outlier classification model 113 separates the telemetry events 102 by corresponding telemetry metric including telemetry metric A events 200 and telemetry metric B events 202 and inputs the telemetry events 102 into the corresponding outlier models including the respective outlier models 203 and 205. The outlier classification model 113 can use the telemetry events 102 to retrain the telemetry metric outlier models 201 and/or to supplement existing training data as the telemetry metric outlier models are periodically retrained and can update the telemetry metric outlier model database 204. For instance, telemetry metric outlier models retrieved from the telemetry metric outlier model database 204 can be retrained according to a schedule or once enough additional training data has been accumulated. The telemetry metric outlier models 203 and 205 can be autoencoders or any other type of unsupervised models that can perform outlier detection such as clustering models (e.g., k-means), isolation forests, or a combination or ensemble of any of the aforementioned models.

The telemetry metric outlier models 203 and 205 use telemetry metric A events 200 and telemetry metric B events 202 to generate telemetry metric A outlier event(s) 206 and telemetry metric B outlier event 208, respectively. The telemetry metric outlier events 206 and 208 comprise telemetry events having metric values and time stamps for the corresponding telemetry metric determined to be outliers or anomalous by the telemetry metric outlier models 203 and 205. The time stamps of telemetry events are tracked by the outlier classification model 113 and the event causality model 115 because they are valuable both for outlier classification and causal analysis. For instance, sequential time stamps for outlier events can indicate a candidate causality chain, and abnormally high or low telemetry metric values at certain time stamps (e.g., a period in a day or week) can indicate outliers. In the example depicted in FIG. 2, telemetry metric B outlier events 208 comprise an event with a value for telemetry metric B at a time stamp t classified as an outlier and telemetry metric A outlier events 206 comprise a value for telemetry metric A at all time stamps in the range t−h to t (h>0) where an outlier was detected at time stamp t−h (and possibly intermediate time stamps as well). In this example, the event causality model 115 has selected the telemetry metric A outlier events 206 as potential cause events with respect to the telemetry metric B outlier event 208 because the telemetry metric B outlier event occurs at a later time stamp of the outlier events 206, 208.

An attention mechanism 207 receives the telemetry metric outlier events 206 and 208 and generates preprocessed telemetry event data 210. The attention mechanism 207 performs a composition of scale, max, and softmax transformations to the telemetry metric A outlier events 206 then matrix multiplies the result with telemetry metric B outlier event 208. An autoencoder 209 receives the preprocessed telemetry event data 210 and outputs an approximation of the preprocessed telemetry event data 210. The autoencoder 209 determines a loss function value between the preprocessed telemetry event data 210 and outputs (e.g., L2 norm). The autoencoder 209 can have a hard coded threshold loss function value below which it determines a causal relationship between at least one of the telemetry events in the telemetry metric A outlier events 206 and the telemetry metric B outlier event 208. Once causality is determined, the event causality model 115 identifies a coefficient for one of the telemetry events in the telemetry metric A outlier events 206 that indicates that telemetry event is causal of telemetry metric B outlier event 208. The operations performed by the attention mechanism 207 and the identification of coefficients indicating causality is described in greater detail below with reference to FIG. 3.

Figure 3:
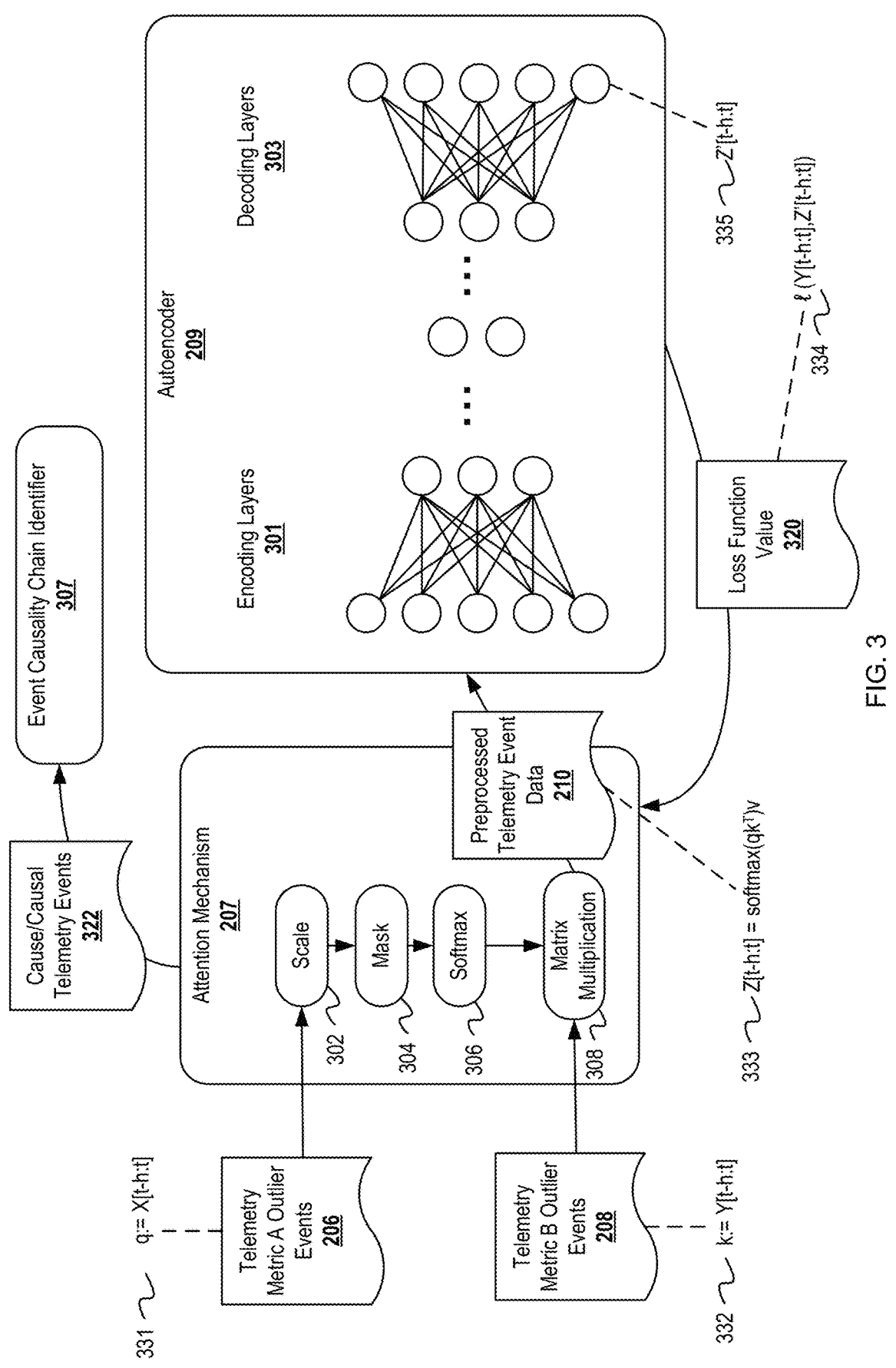
FIG. 3 is a schematic diagram of an event causality identification engine for telemetry events.

FIG. 3 is a schematic diagram of an event causality identification engine for telemetry metric data. FIG. 3 elaborates on the attention mechanism and autoencoder in FIG. 2.

The attention mechanism 207 receives telemetry metric A outlier events 206 and telemetry metric B outlier event 208 represented by symbol q:=X[t–h:t–1] 331 and symbol k:=Y [t–h:t] 332, respectively. Y[t–h:t] represents the value for telemetry metric B at time stamps t–h to t and X[t–h:t–1] represents the values for telemetry metric A at time stamps t–h to t–1. Telemetry metrics A and B can be any telemetry metrics related to device health/performance, network health/performance, product usage, threat prevention, etc. These metrics can be across distinct devices and/or networks, for instance to track root cause for a sequence of processes executed at different endpoints on a network or across networks.

The attention mechanism is FIG. 3 is depicted using standard query/key/value notation (q, k, v). In this instance, the query is X[t–h:t–1], the key is Y[t–h:t], and the value is X[t–h:t–1]. This choice has the effect of tracking possible causal events in X to events in Y in the window from time stamp t–h to t. Other attention mechanisms using other normalizations, other activation functions, using different choices for query/key/value, etc. can be implemented. The attention mechanism can additionally be a multi-headed attention mechanism that tracks causality between more than two telemetry metrics simultaneously.

The attention mechanism 207 includes multiple layers of operations to focus attention of the autoencoder. The attention mechanism 207 performs a scale operation 302, a mask operation 304, and a softmax (or argmax) operation ("softmax") 306. For instance, the scale operation 302 can normalize the entries of X[t–h:t–1], the mask operation 304 can be an elementwise weighting of each entry in X[t–h:t–1] for pretrained weights, and the softmax operation/layer 306 can be a generalized logistic function, activation function, etc. Subsequently, a matrix multiplication 308 is applied to the telemetry metric B outlier event 208 and the transformed telemetry metric A outlier event 206 such as a weighted combination. An example attention mechanism is the following:

Z[t–h:t]=softmax(wk$^T$)v, denoted by symbol 333. In this example, the value is defined as v:=X[t–h:t–1]. The mask operation 304 has the effect of focusing on specific time stamps in the telemetry metric A outlier events 206 while simultaneously accounting for the causal effect of all time stamps. The attention mechanism 207 can implement multiple mask operations isolating distinct time stamps. When determining which time stamps are causal to outputs of the autoencoder 209 (and, thus, causal to Y[t–h:t]), the attention mechanism 207 can analyze values at the softmax layer 306 (e.g., the outputs of example equation 333) corresponding to each time stamp. Other types of layers indicating causal relationships such as alignment and context transformations can be implemented. The weights for each mask operation can depend on the number of time stamps, the types of telemetry metrics A and B, etc. and can be pretrained for each pair of telemetry metrics or across pairs of telemetry metrics. Because the attention mechanism 207 is a sequence of layers in a neural network, it is trained as an ensemble with the autoencoder 209 by backpropagating the loss through the network layers of the attention mechanism 207 (e.g., via gradient descent). This can be used to train the internal parameters of the attention mechanism 207 for each pair of telemetry metrics A and B.

The autoencoder 209 receives and inputs the preprocessed telemetry event data 210 through encoding layers 301 and decoding layers 303. The encoding layers 301 compress the preprocessed telemetry event data 210 which makes decoding the internal layer (represented by two nodes in FIG. 3)

non-trivial. The ensemble of the attention mechanism 207 and the autoencoder 209 detects a casual relationship between at least one of the telemetry events in the telemetry metric A outlier events 206 and the telemetry metric B outlier event 208 by reconstructing the telemetry metric B outlier events 208 Y[t–h:t] in the final layer of the autoencoder 209 represented as symbol Z'[t–h:t] 335 with a high loss function value represented by symbol l(Y[t–h:t], Z'[t–h:t]) 334 in loss function value 320.

The attention mechanism 207 (or, alternatively, a separate analytic component of the event causality identification engine depicted in FIG. 3) receives the loss function value 320 from the autoencoder 209 computed from the difference between the input and output. If the loss function value 320 is sufficiently high, then the attention mechanism 207 infers a causal relationship between at least one of the telemetry metric A outlier events 206 and the telemetry metric B outlier event 208. The attention mechanism 207 can additionally verify that a reconstruction value at the decoding layer (e.g., equation 335) corresponding to time stamp t is sufficiently small (e.g., below a threshold value), which implies a causal relationship between at least one of the telemetry metric outlier events 206 specifically at time t. The notion of "sufficiently small" can be determined during training or by observing outputs of the ensemble of attention mechanism 207 and the autoencoder 209 on pairs causal events and corresponding intervening events. The attention mechanism 207 then analyzes values at internal layers resulting from the input telemetry metric outlier events 206 and 208 to determine which of the telemetry metric A outlier events 206 are casual. For instance, the attention mechanism 207 can look at outputs from the softmax layer 306 that indicate importance of specific values in the telemetry metric A outlier events 206 X[t–h:t–1] in causing outputs of the autoencoder 209, which implies a causal relationship with the telemetry metric B outlier event 208. The attention mechanism 207 can use one or more causality criteria to determine causality telemetry events from the telemetry metric A outlier events 206, for instance by taking telemetry events corresponding to values at a softmax layer above a threshold value, taking the telemetry event with the maximal softmax layer value, etc. The use of a value at a layer of a neural network herein for identifying causal telemetry events denotes the value occurring at that layer as a result of inputs to the neural network (i.e., values computed by the neural network at that layer) and not to internal parameters of the neural network at that layer. In some embodiments the attention mechanism 207 infers causality of one or more of the telemetry metric outlier events 206 without identifying individual events. The attention mechanism 207 or another component of an event causality identification engine adds cause events identified in the telemetry metric A outlier events 206 as well as the corresponding causal event (i.e., telemetry metric B outlier event 208) to cause/causal telemetry events 322.

An event causality chain identifier 307 receives the cause/causal telemetry events 322. The event causality chain identifier 307 can determine overlapping pairs of telemetry events and can chain events together based on the overlap. Multiple events can be causal to a single telemetry event, and a telemetry event can be causal to multiple telemetry events, resulting in a graph structure of causality chains. The event causality chain identifier 307 can infer causality chains as paths in the graph structure, for instance, by starting at an earliest time stamp in the pairs of events having overlaps and tracing causality chains by the earliest telemetry event in each chain proceeding sequentially through the time stamps.

The use of an attention mechanism/autoencoder as depicted variously herein allows for simultaneous causal analysis of telemetry events at multiple time stamps for a first telemetry metric (often depicted as 'telemetry metric A') and a single time stamp for a second telemetry metric (often depicted as 'telemetry metric B'). The attention mechanism facilitates simultaneous causal analysis by first determining causality based on outputs of the autoencoder and then determining relevant inputs for the first telemetry metric based on values at internal layers of the attention mechanism. Training the attention mechanism as an ensemble with the autoencoder enables the attention mechanism to make these determinations. Simultaneous causal analysis avoids the need for causal analysis of individual pairs of telemetry events for the first and second telemetry metric which can result in increased overall efficiency of the system. In embodiments where only a single pair of telemetry events for the first and second telemetry events is analyzed, simpler models can be implemented. The attention mechanism depicted herein comprises scale, mask, softmax, and matrix multiplication operations/layers. Any attention mechanism that is trained as an ensemble with an autoencoder to focus on inputs for the first telemetry metric can be implemented. Attention mechanisms that are neural networks can vary with respect to number, size, and type of internal layers such as different activation functions, types of masking operations, etc.

FIGS. 4-8 are flowcharts of example operations that expand upon the preceding example illustrations. The example operations are described with reference to an event causality identification engine, an event causality model, an attention mechanism, and an autoencoder for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
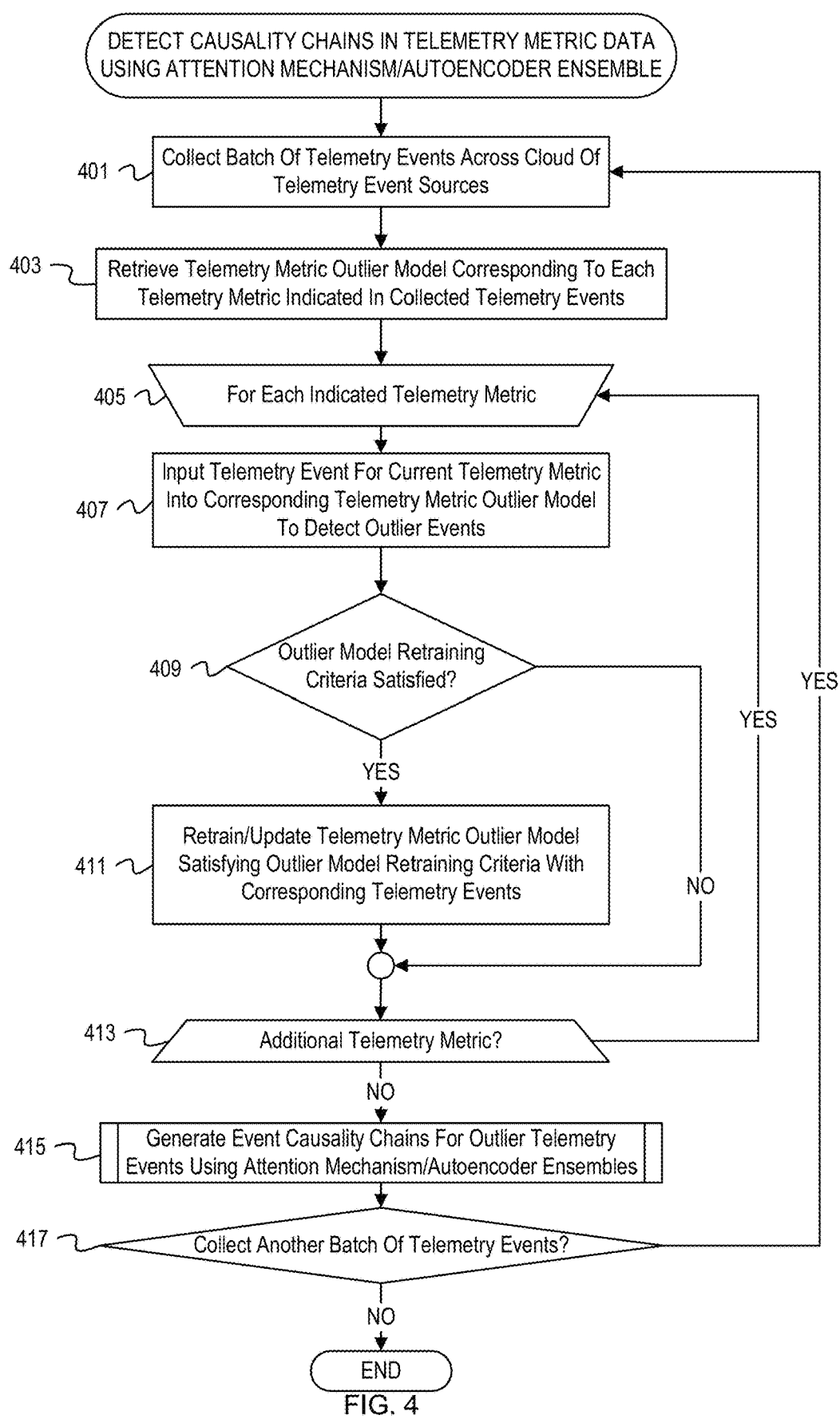
FIG. 4 is a flowchart of example operations for detecting causality chains in telemetry events using attention mechanism/autoencoder ensembles.

FIG. 4 is a flowchart of example operations for detecting causality chains in telemetry metric data using attention mechanism/autoencoder ensembles. At block 401, an event causality identification engine collects telemetry events across a cloud of telemetry event sources. The data sources can be mobile devices, personal computers, servers, etc. across a network or multiple networks. The telemetry events can correspond to device performance/health, product usage, threat prevention, etc. Any number of analytic metrics can be collected across data and device types. The telemetric events can be collected at intervals of time stamps at which telemetry events are generated on corresponding devices or can be collected at periodic intervals. The intervals can depend on the time and/or severity of the telemetry metric. For instance, the event causality identification engine can receive logs from a security product indicating a percentage of security policies that allow traffic and additionally have an attached data filtering security profile. The event causality identification engine can determine this telemetry metric relates to broader functionality of a security policy and therefore has a lower severity and can collect this telemetry metric once a week. Each batch of telemetry events can correspond to data collected across periodic cycles for one or more telemetry metrics. Different batches can be collected at distinct time intervals for different combinations of telemetry metrics. Indicators or identifiers of the different telemetry metrics can be maintained in association with the corresponding events and/or the collected events organized accordingly (e.g., different storage paths).

At block 403 the event causality identification engine retrieves a telemetry metric outlier model corresponding to each telemetry metric in the batch of telemetry events. The event causality identification engine can query a telemetry metric outlier model database with the telemetry metric indicators or identifiers and the database can return the corresponding models. The telemetry metric outlier models can be any unsupervised learning models trained to detect outlier telemetry events across one or more telemetry metrics. For instance, clustering models (e.g., k-means, DBSCAN), autoencoders, etc. can be used and updated to track outliers that are above a threshold loss.

At block 405, the event causality identification engine begins iterating through telemetry metrics indicated in the batch of telemetry events. The example operations at each iteration include the operations at blocks 407, 409, and 411. The description refers to a telemetry metric of a current iteration as the current telemetry metric.

At block 407, the event causality identification engine inputs telemetry metric data for the current telemetry metric into the corresponding telemetry metric outlier model to detect outlier events. The event causality identification engine can determine whether an output of the telemetry metric outlier model is below or above a threshold value that indicates that the corresponding telemetry event is an outlier. Other criteria for outputs of the telemetry metric outlier model can be used, and in some instances the telemetry metric outlier models output a binary indicator of whether inputs are outliers.

At block 409, the event causality identification engine determines whether outlier model retraining criteria are satisfied for the telemetry metric outlier model. The outlier model retraining criteria can be according to a fixed schedule, based on whether a threshold amount of additional training data in the telemetry metric data has been received, etc. If the outlier model retraining criteria is satisfied, flow proceeds to block 411. Otherwise, flow skips to block 413.

At block 411, the event causality identification engine retrains and updates the telemetry metric outlier model satisfying the outlier model retraining criteria with the corresponding telemetry events. For instance, when the telemetry metric outlier model is an autoencoder, the event causality identification engine can use the telemetry events as additional batches of training and/or testing data. Once retrained or updated, the event causality identification engine can communicate the telemetry metric outlier model to a telemetry metric outlier model database for updating.

At block 413, the event causality identification engine determines whether there are telemetry events for an additional telemetry metric in the current batch of telemetry events. If there are telemetry events for an additional telemetry metric, flow return to block 405. Otherwise, flow proceeds to block 415.

At block 415, the event causality identification engine generates event causality chains for outlier telemetry events with an attention mechanism/autoencoder ensemble(s). The operations at block 415 are described in greater detail with respect to FIG. 5.

At block 417, the event causality identification engine determines whether to collect another batch of telemetry metric data. Embodiments may task a different program or device with collection of events and the event causality identification engine would check a storage location for additional events. If a condition for collection is satisfied (e.g., time interval expiration, notification, etc.), flow returns to block 401. Otherwise, the flow in FIG. 4 is complete.

Figure 5:
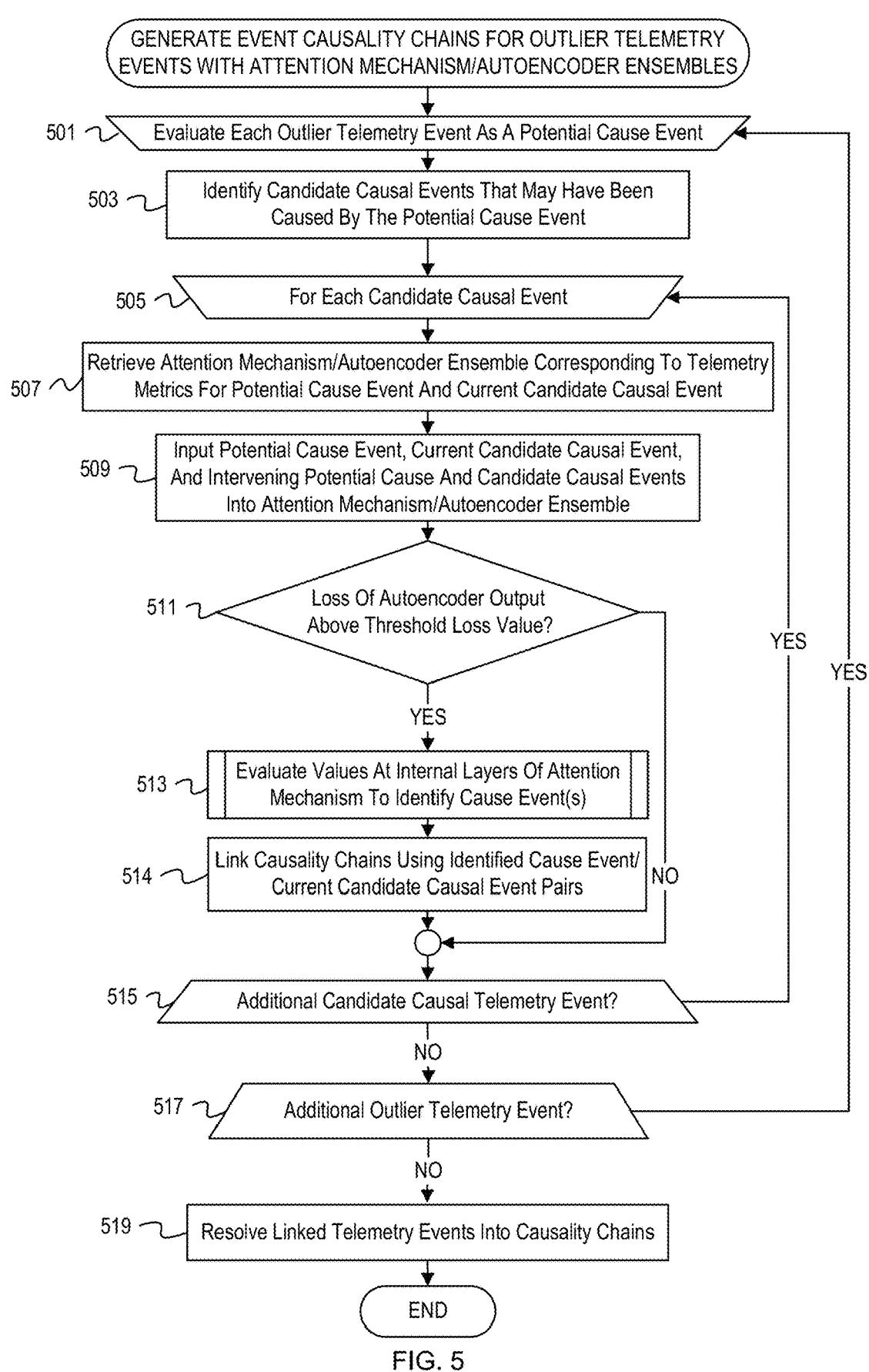
FIG. 5 is a flowchart of example operations for determining event causality chains in outlier telemetry events using attention mechanism/autoencoder ensembles.

FIG. 5 is a flowchart of example operations for generating event causality chains for outlier telemetry events using attention mechanism/autoencoder ensembles. At block 501, an event causality identification engine begins iterating through outlier telemetry events that were detected by the outlier models (407) to evaluate each outlier telemetry event as a potential cause for another of the outlier telemetry events ("potential cause event"). The event causality identification engine can iterate through the detected outlier telemetry events by time stamps starting with the earliest time stamp. Alternatively, the event causality identification engine can iterate through outlier telemetry events for each telemetry metric sequentially from the earliest time stamp. Other methods of iteration, such as starting at the latest time stamp and going backwards, are possible. The example operations at each iteration occur at blocks 503, 505, 507, 509, 511, 513, and 515.

At block 503, the event causality identification engine identifies one or more of the other outlier telemetry events as a candidate causal event that may have been caused by the potential cause event. The event causality identification engine identifies those of the outlier telemetry events occurring subsequent to the potential cause event as candidates, thus filtering out predecessor events. The event causality identification engine can iterate through time stamps in the outlier telemetry events to determine outlier telemetry events that occurred after the potential cause event. In addition to temporal identification/filtering of candidates, embodiments can apply conditions or heuristics to identify candidate causal events. For instance, the event causality identification engine can filter out from consideration those of the outlier telemetry events of specified types and/or metrics known to be independent or unaffected by events of the type and/or metric of the potential cause event.

At block 505, the event causality identification engine begins iterating through each candidate causal event. In some embodiments, the candidate causal events are with a same time window for a same telemetry metric for causality analysis by the attention mechanism/autoencoder ensemble. In these instances, the event causality identification engine can skip previously analyzed candidate causal events in future iterations. The operations at each iteration occur at blocks 507, 509, 511, and 513.

At block 507, the event causality identification engine retrieves an attention mechanism/autoencoder ensemble corresponding to a pair of telemetry metrics for the potential cause event and current candidate causal event. The event causality identification engine can query a database of autoencoder/attention mechanism ensembles with the current pair of telemetry metrics. The pairs of telemetry metrics can be indexed such that the order of the telemetry metrics in the index determines the causality between the telemetry metrics (i.e., a telemetry metric appearing first in a query implies that the first telemetry metric is causal to the second telemetry metric). Autoencoder/attention mechanism ensembles can be maintained for both temporal orders of telemetry metrics in a pair. In cases where no autoencoder/attention mechanism ensemble for the telemetry metrics of the pair of events is present in the database, the event causality identification engine can initialize and train an autoencoder/attention mechanism ensemble.

At block 509, the event causality identification engine inputs the potential cause event, the current candidate causal event, and intervening potential cause and candidate causal telemetry events (if any) into the attention mechanism/ autoencoder ensemble. The intervening potential cause and candidate causal telemetry events comprise events within a same time window for the respective telemetry metrics that may be normal/non-outlier events. At least one of those intervening potential cause events may be a cause event for the current candidate causal event or any of the intervening candidate cause events. The input can be a tuple comprising the indicated events and, in some embodiments, associated time stamps. Additional input data can be accounted for in the architecture of the attention mechanism via the choice query/key/value. The architecture of the attention mechanism/encoder ensemble can be designed to accommodate up to a maximum number of input event indications. The input and internal vectors can be padded when less than the maximum number of event indications constitute the input. The architecture is also designed to indicate a defined size or section for each event indication. The event causality identification engine can perform various preprocessing operations such as normalization prior to the input.

At block 511, the event causality identification engine determines whether the loss of the autoencoder output is above a threshold loss value. The threshold loss value can be determined during training by measuring statistics of loss values on training and/or testing data. The event causality identification engine can additionally determine that the reconstruction of the telemetry event at the time stamp of the candidate causal event is sufficiently small, so that at least one of the potential cause event and intervening potential cause event caused this event individually. Other criterion for inferring causality using the loss function value and reconstruction generated by the attention mechanism/autoencoder ensemble can be used. If the loss is above the threshold loss value and/or the reconstruction error at the time stamp of the current candidate causal event is sufficiently small, flow proceeds to block 513. Otherwise, flow skips to block 515.

Figure 6:
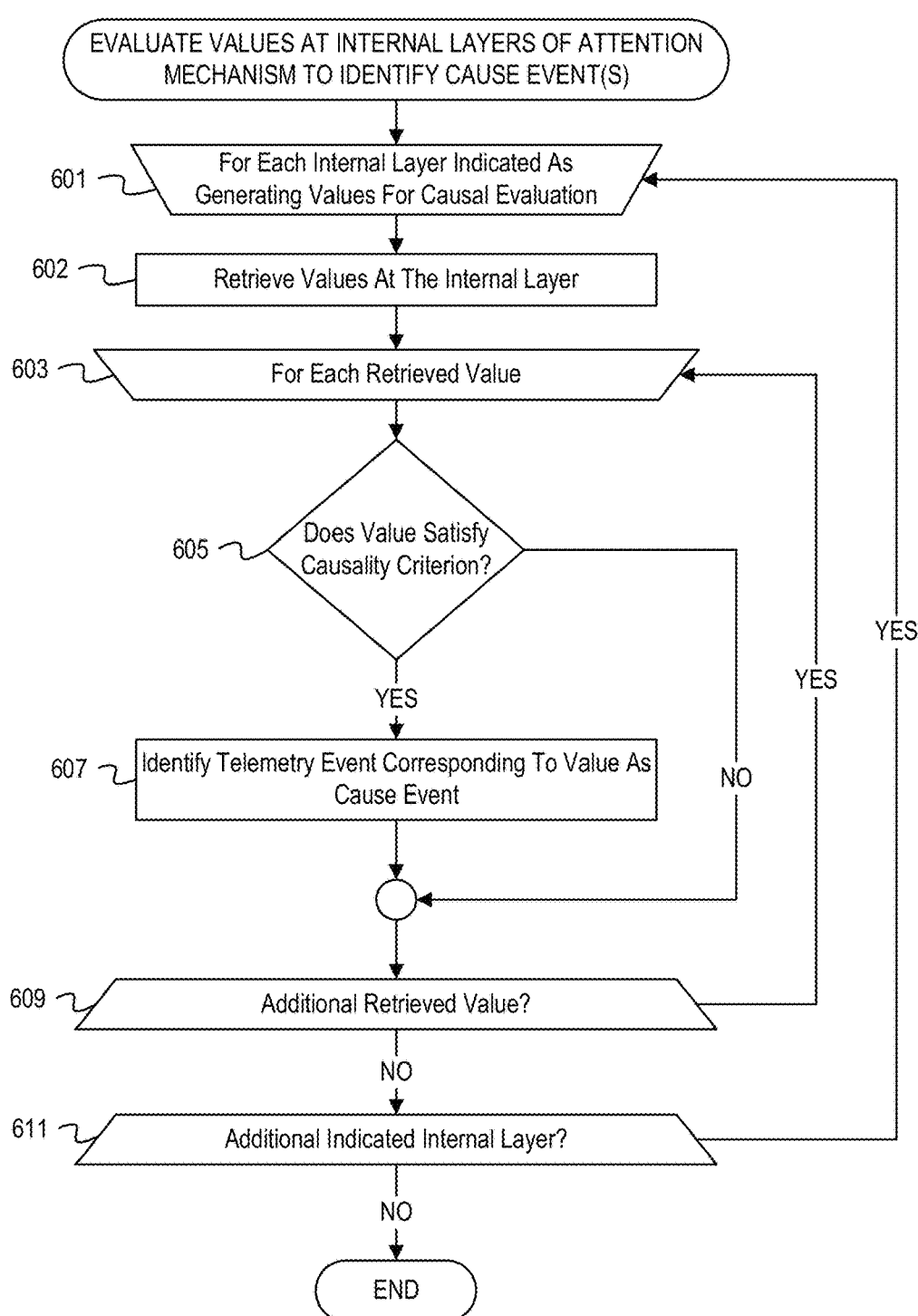
FIG. 6 is a flowchart of example operations for evaluating values at internal layers of an attention mechanism to identify a cause event(s).
Figure 7:
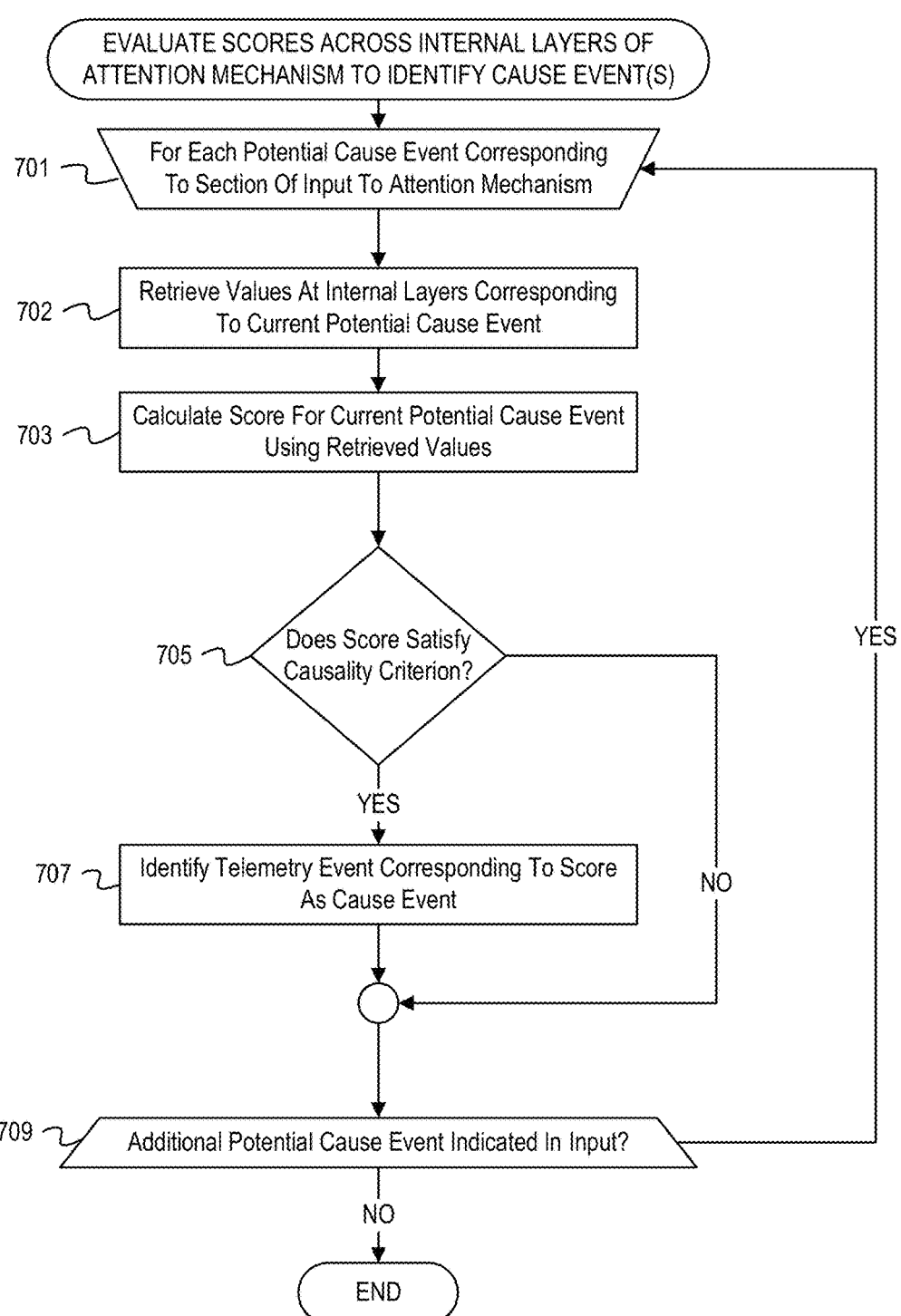
FIG. 7 is a flowchart of example operations for evaluating scores for potential cause events across internal layers of an attention mechanism to identify cause event(s).

At block 513, the event causality identification engine evaluates values of internal layers of the attention mechanism to identify which of the potential cause events and intervening events likely caused the candidate causal event. The internal layer values are based on the telemetry events that are concatenated to generate the input to the attention mechanism. FIG. 6 provides an example implementation for this operation using values at internal layers of the attention mechanism. FIG. 7 gives another example implementation for this operation using scores across internal layers of the attention mechanism.

At block 514, the event causality identification engine links causality chains using identified cause event/current candidate causal event pairs. The event causality identification engine can link each of the identified cause event(s) to the current candidate causal event in a tree structure of causality chains. In some embodiments, more than one cause event is linked to the current candidate causal event and causality chains can comprise paths along any of the linked cause events.

At block 515, the event causality identification engine determines if there is an additional candidate causal event. If an additional candidate causal event is present, flow returns to block 505. Otherwise, flow proceeds to block 517.

At block 517, the event causality identification engine determines whether there is an additional outlier telemetry event to evaluate as a potential cause event. If an additional outlier telemetry event is present for evaluation, flow returns to block 501. Otherwise, flow proceeds to block 519.

At block 519, the event causality identification engine resolves linked telemetry events into causality chains. The event causality identification engine resolves causality chains based on the linked cause event/candidate casual telemetry event pairs. Causality chains can be formed by sequences of cause/causal telemetry event pairs, each telemetry event causal to the next telemetry event in the chain and ordered based on time stamps. In some instances, causality chains comprise a graph structure when multiple prior telemetry events are determined to cause a single telemetry event and a telemetry event is determined to cause multiple future telemetry events. The event causality identification engine can determine a path in the graph structure as causality chains that can subsequently be used for root cause analysis.

FIG. 6 is a flowchart of example operations for evaluating values at internal layers of an attention mechanism to identify a cause event(s). At block 601, an event causality model begins iterating through internal layers indicated as generating values for causal evaluation. The internal layers used for causal evaluation are determined when designing the architecture of a corresponding attention mechanism/ autoencoder ensemble. For instance, when the attention mechanism is a neural network, the internal layers for causal evaluation comprise internal network layers that are effective for isolating contributions of sections of input to the attention mechanism corresponding to potential cause events. Example operations at each iteration occur at blocks 602, 603, 605, 607, and 609.

At block 602, the event causality model retrieves values at layer(s) of an attention mechanism for identification of a cause event(s). The values at the internal layers of the attention mechanism are based on the sections of an input into the attention mechanism (i.e., input provided at block 509 of FIG. 5). Within each internal layer indicated as generating values for causal identification, each value corresponds to a potential cause event for a first telemetry metric. The potential cause events (i.e., the detected outlier event and any intervening events) causal outlier telemetry event are concatenated as input to the attention mechanism so that masking and softmax operations can focus on specific sections of the concatenated input.

Every layer of the attention mechanism does not necessarily generate values relevant to causal identification. The layers that generate values for consideration to identify causality can be indicated by hard coded values that relate to the configuration of the attention mechanism (e.g., "layer 2"). As another example, the attention mechanism/autoencoder ensemble can be configured/designed to output values at relevant internal layers to specified memory structures (e.g., a queue) or memory location. A relevant layer(s) can occur after multiple other preprocessing layers of the attention mechanism. For instance, a softmax layer after several mask layers can be a layer for which the event causality model retrieves values. In some embodiments, multiple layers of a same type (such as multiple softmax layers) can be selected for value retrieval by the event causality model when these multiple layers calculate separate but relevant scores for causality.

At block 603, the event causality model begins iterating through retrieved values at the current internal layer. The example operations at each iteration occur at blocks 605 and 607.

At block 605, the event causality model determines whether the current retrieved value (or current score) satisfies a causality criterion. For instance, the causality criterion can be that the current retrieved value be the largest among all retrieved values at the current layer, that the current retrieved value is above a certain percentile of all retrieved values at the current layer, etc. The causality criterion can depend on a type of layer at the current iteration. For instance, a softmax layer has normalized outputs so that a causality criterion can be that the value is above a fixed threshold value that is predetermined based on training of the attention mechanism/autoencoder ensemble. Causality criteria can further depend on types of telemetry metrics. A causality criterion can weight the value based on a time stamp for the corresponding potential cause event. For instance, when the telemetry metric is CPU usage, the causality criterion can give lower weights to values corresponding to events that occur at times of peak CPU usage, and higher weights to values corresponding to events that occur at times of low CPU usage. If the value satisfies the causality criterion, flow proceeds to block 607. Otherwise, flow skips to block 609.

At block 607, the event causality model identifies a telemetry event corresponding to the current retrieved value as a cause event. The event causality model can potentially identify a cause event at each iteration, resulting in more than one cause event across iterations. The telemetry event is identified as corresponding to a section of the input that influenced or generated the current retrieved value in the attention mechanism. For instance, a masking operation at a prior layer can isolate a specific section of the input corresponding to the telemetry event and a softmax layer can normalize the contribution of the telemetry event across sections of the input at the layer of the current retrieved value. The identified cause event is paired with a corresponding causal event (e.g., the causal outlier telemetry event for the second telemetry metric) for causality.

At block 609, the event causality model determines whether there is an additional retrieved value at the current internal layer. If an additional retrieved value is indicated, flow returns to block 603. Otherwise, the flow proceeds to block 611.

At block 611, the event causality model determines whether there is an additional internal layer indicated for causal evaluation in the attention mechanism. If there is an additional indicated internal layer, flow returns to block 601. Otherwise, the operations in FIG. 6 are complete.

FIG. 7 is a flowchart of example operations for evaluating scores for potential cause events across internal layers of an attention mechanism to identify cause event(s). At block 701, an event causality model begins iterating through potential cause events corresponding to sections of an input to the attention mechanism. Each section of the input comprises a value for a telemetry metric corresponding to a potential cause event and, in some embodiments, a time stamp for the potential cause event. The input further comprises a causal event that the potential cause event may have caused. The example operations at each iteration occur at blocks 702, 703, 705, and 707.

At block 702, the event causality model retrieves values at internal layers in the attention mechanism indicated for causal evaluation that correspond to the current potential cause event. The internal layers can be indicated by hardcoded values in the attention mechanism or stored in labelled memory by a separate component managing inputs and outputs to an ensemble of the attention mechanism and an autoencoder. Alternatively, the attention mechanism can automatically generate outputs from the indicated internal layers to a specific place in memory. Each value at each internal layer corresponds to a distinct potential cause event and can be indicated as a section of input, indexed by a section index for the input, or labelled by a corresponding time stamp to identify the potential cause event. In some embodiments, the attention mechanism can automatically output vectors of values at internal layers for evaluation, each vector corresponding to a potential cause event.

At block 703, the event causality model calculates a score for the current potential cause event using the retrieved values. The score can be, for instance, an average, a maximum, or other transformation of the retrieved values for the current potential cause event. Values at certain internal layers can be weighted in the score according to known importance of each layer (e.g., by testing or architectural design of the attention mechanism). In some embodiments, the event causality model can calculate scores across all potential cause events before proceeding to block 705 (e.g., when a causality criterion depends on all scores).

At block 705, the event causality model determines whether the score satisfies a causality criterion. In addition to the aforementioned causality criteria such as a maximal score across all potential cause events, score within a percentile of all potential cause events, a time stamp criterion, etc., the causality criteria can further depend on the specific score being used. For instance, a threshold score can be tuned based on scores in training data for the attention mechanism/autoencoder ensemble (e.g., a threshold score representing a percentile of scores seen in training data). Evaluating potential cause events with scores across multiple layers can result in a stricter causality criterion and can be used to detect stronger causality chains. If the score satisfies the causality criterion, flow proceeds to block 707. Otherwise, flow skips to block 709.

At block 707, the event causality model identifies a telemetry event corresponding to the score as a cause event. The telemetry event can be identified by indicators stored in the score for the current potential cause event, by a time stamp in the section of input to the attention mechanism corresponding to the potential cause event, etc. The cause event is paired with a causal event that was also used in the concatenated input to the attention mechanism to detect causality.

At block 709, the event causality model determines if there is an additional potential cause event indicated in the input to the attention mechanism. If an additional potential cause event is indicated, flow returns to block 701. Otherwise, the operations in FIG. 7 are complete.

Figure 8:
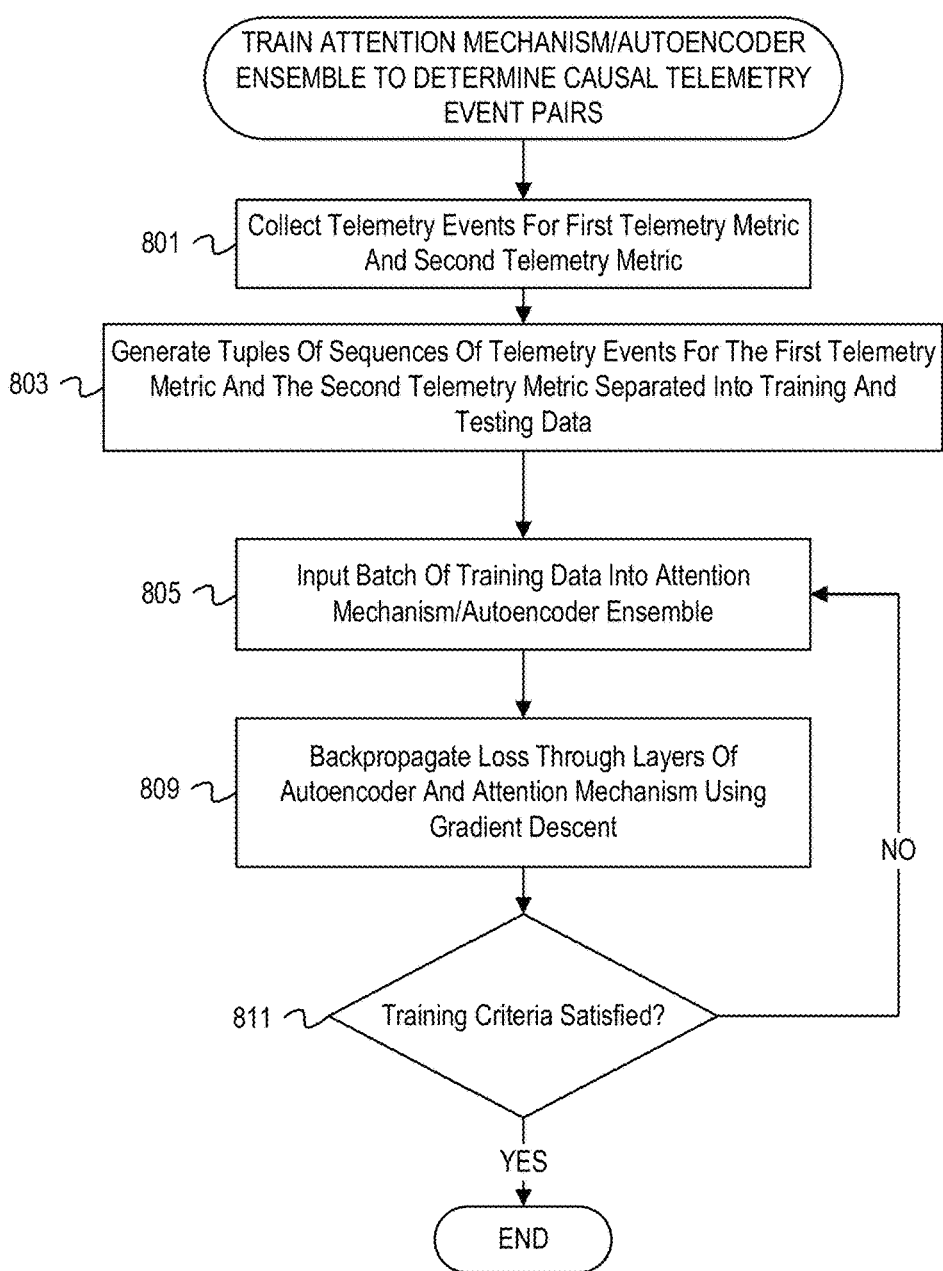
FIG. 8 is a flowchart of example operations for training an attention mechanism/autoencoder ensemble to determine causal telemetry event pairs.

FIG. 8 is a flowchart of example operations for training an attention mechanism/autoencoder ensemble to determine causal telemetry event pairs. At block 801, an event causality identification engine collects telemetry events for a first telemetry metric and a second telemetry metric. The event causality identification engine can determine the first and second telemetry metrics for training an attention mechanism/autoencoder ensemble when a first and second outlier event for the first and second telemetry metrics are identified as candidates for causality from the first outlier event to the second outlier event and no attention mechanism/autoencoder ensemble for the first and second telemetry metric has been previously trained. Alternatively, the operations in FIG. 8 can occur for retraining when a sufficient amount of training data for the first and second telemetry metric has been collected by the event causality identification engine. Events for the first telemetry metric will be detected by the attention mechanism/autoencoder pairs as having a causal relationship with events for the second metric.

At block 803, the event causality identification engine generates tuples of sequences of telemetry events for the first telemetry metric and the second telemetry metric separated into training and test data. The sequence of telemetry events comprises telemetry events for the first telemetry metric and second telemetry metric within a window of time stamps. The sequences can be of equal length or varying length depending on the architecture of the attention mechanism/autoencoder ensemble. In some embodiments, sequences that are too short for inputting into the ensemble can be padded with zeroes when generating the tuples. The tuples can be generated based on outlier telemetry events for the first and second telemetry metric, for instance when the beginning of the sequence of telemetry events is an outlier telemetry event and the telemetry event for the second telemetry metric is an outlier telemetry event. The separation of training and testing data can be randomized and based on a desired percentage of training and test data.

At block 805, the event causality identification engine inputs a batch of training data into the attention mechanism/autoencoder ensemble. The size of each training batch can depend on the architecture of the attention mechanism/autoencoder ensemble (e.g., more parameters imply larger batches) and can be a hard coded value during training.

At block 809, the event causality identification engine backpropagates loss of the batch inputs through layers of the autoencoder and the attention mechanism using gradient descent. Other backpropagation techniques other than gradient descent can be implemented. Because the attention mechanism is a neural network, backpropagation occurs using the chain rule on the composition of neural networks (i.e., the attention mechanism and autoencoder).

At block 811, the event causality identification engine determines whether training criteria are satisfied for the autoencoder/attention mechanism ensemble. For instance, the training criteria can be that training error and generalization error (i.e., error on the testing data) are sufficiently low, that loss on the training data stabilizes across iterations, etc. If the training criteria are not satisfied, flow returns to block 805. Otherwise, the operations in FIG. 8 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 507, 509, 511, and 513 can be performed in parallel or concurrently. With respect to FIG. 4, retraining and/or updating the telemetry metric outlier models is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 9:
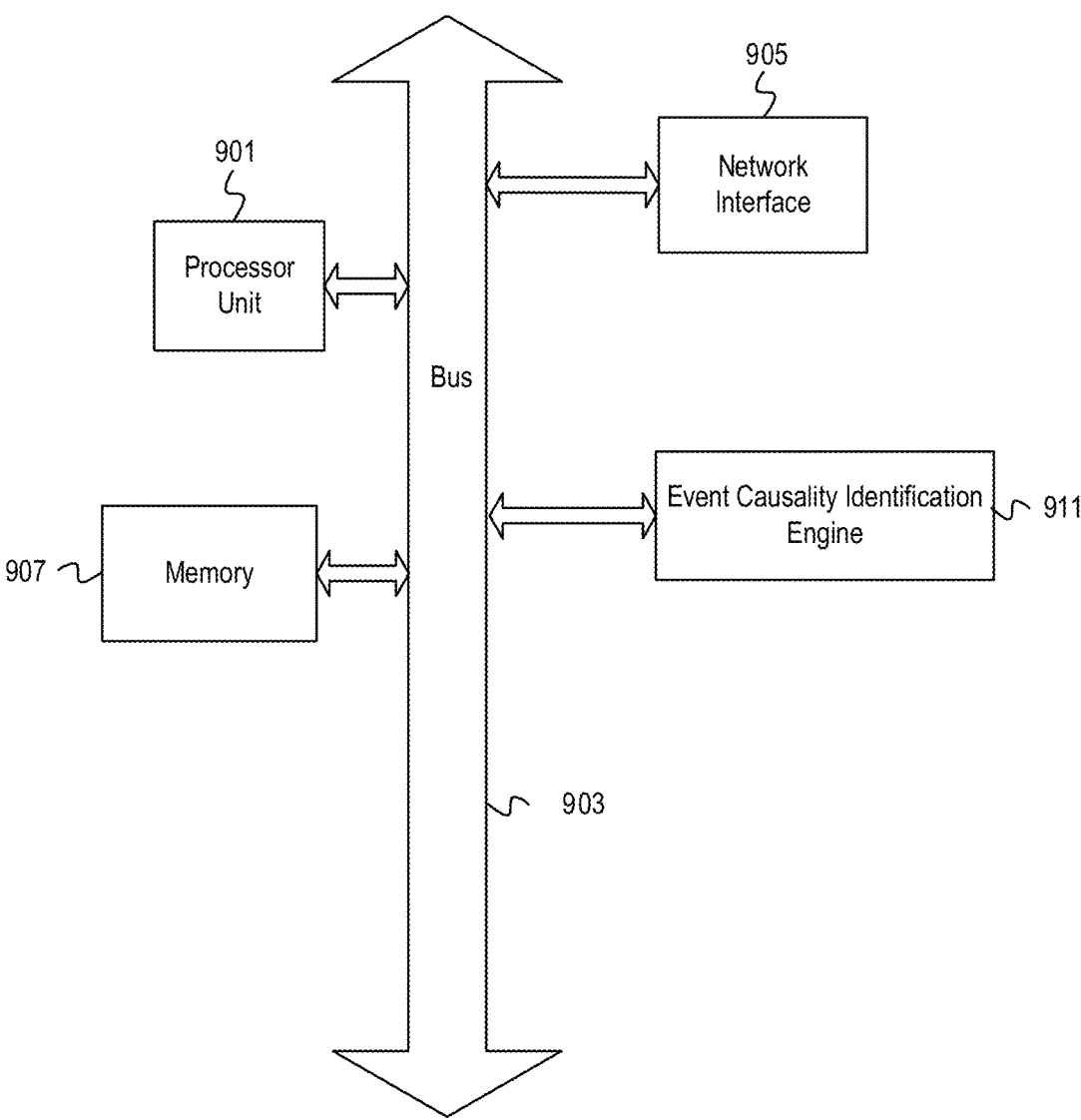
FIG. 9 depicts an example computer system with an event causality identification engine.

FIG. 9 depicts an example computer system with an event causality identification engine 911. The computer system includes a processor 901 (possibly including multiple processors, multiple cores, multiple nodes, and/or implementing multi-threading, etc.). The computer system includes memory 907. The memory 907 may be system memory or any one or more of the above already described possible realizations of machine-readable media. The computer system also includes a bus 903 and a network interface 905. The system also includes an event causality identification engine 911. The event causality identification engine 911 can identify outlier telemetry events and determine causal relationships between pairs and chains of telemetry events using a combination of an attention mechanism and autoencoder as described variously above. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for identification of causality between telemetry events detected in telemetry metric data aggregated across of a cloud of endpoint devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:

determining, with a set of one or more unsupervised learning models, a plurality of outliers in a first plurality of telemetry events across a plurality of telemetry metrics for computing resources;

inputting a plurality of event indications into an ensemble of an attention mechanism and an autoencoder, wherein the plurality of event indications at least include indications of a first outlier of the plurality of outliers and a second outlier of the plurality of outliers that occurs after the first outlier, and wherein the first outlier is an outlier telemetry event of a first telemetry metric of the plurality of telemetry metrics and the second outlier is an outlier telemetry event of a second telemetry metric of the plurality of telemetry metrics;

determining that a loss function value for the ensemble of the attention mechanism and the autoencoder on the input of the plurality of event indications satisfies a first criterion based on a threshold loss function value;

based on determining that the loss function value satisfies the first criterion, determining which values of a set of one or more values output by a first internal layer of the attention mechanism satisfy a second criterion, wherein the second criterion comprises a criterion that a value output by the first internal layer at least one of exceeds one or more threshold values and exceeds a threshold percentile of values observed at one or more internal layers of the attention mechanism including the first internal layer; and based on determining that a first value of the set of one or more values output by the first internal layer corresponding to a first telemetry event of the first telemetry metric satisfies the second criterion, indicating the first telemetry event of the first telemetry metric as causing the second outlier.

2. The method of claim 1, wherein each of the plurality of telemetry metrics for the computing resources corresponds to one or more telemetry metric values and one or more corresponding time stamps.

3. The method of claim 1, further comprising:

based on determining that the loss function value satisfies the first criterion, determining which of a set of one or more values at a plurality of layers of the attention mechanism satisfies the second criterion; and based on determining that a second value of the set of one or more values output by the plurality of layers corresponding to a second telemetry event of the first telemetry metric satisfies the second criterion, indicating a second telemetry event of the first telemetry metric as causing the second outlier.

4. The method of claim 1, wherein the second criterion comprises a determination that a value in the set of one or more values at the first internal layer of the attention mechanism is a maximal value of the set of one or more values at the first internal layer of the attention mechanism.

5. The method of claim 1, further comprising identifying a plurality of intervening telemetry events occurring after the first outlier and prior to the second outlier.

6. The method of claim 5, wherein the plurality of event indications at least includes indications of the plurality of intervening telemetry events.

7. The method of claim 5, wherein one or more of the plurality of intervening telemetry events comprise telemetry events of the first telemetry metric and the second telemetry metric.

8. The method of claim 1, wherein the attention mechanism is a neural network, further comprising training the ensemble of the autoencoder and the attention mechanism on metric values for the first telemetry metric and the second telemetry metric using backpropagation.

9. The method of claim 1, wherein determining that the loss function value for the ensemble of the attention mechanism and the autoencoder on the input of the plurality of event indications satisfies the first criterion comprises determining that the loss function value exceeds the threshold loss function value.

10. The method of claim 1, further comprising generating a causality chain for the first plurality of telemetry events based, at least, in part, on the indication of the first telemetry event as causing the second outlier.

11. One or more non-transitory computer-readable media having program code stored thereon having program code stored thereon, the program code comprising instructions to:

determine, with a set of one or more unsupervised learning models, a plurality of outliers in a first plurality of telemetry values of a plurality of telemetry metrics for computing resources;

input, into an ensemble of an attention mechanism and an autoencoder, indications of a first outlier of the plurality of outliers and a second outlier of the plurality of outliers that occurs after the first outlier, wherein the first outlier is of a first telemetry metric of the plurality of telemetry metrics and the second outlier is of a second telemetry metric of the plurality of telemetry metrics;

determine whether a loss function value output from the autoencoder based on input to the ensemble satisfies a first criterion based on a threshold loss function value;

based on a determination that the loss function value satisfies the first criterion, evaluate a set of one or more values output by a first internal layer of the attention mechanism to identify a first telemetry value of the first telemetry metric as having a causal link to the second outlier, wherein the instructions to evaluate the set of one or more values to identify the first telemetry value comprise instructions to determine that the first telemetry value at least one of exceeds one or more threshold values and exceeds a threshold percentile of values observed at one or more internal layers of the attention mechanism including the first internal layer; and indicate the causal link between the first telemetry value and the second outlier.

12. The one or more non-transitory computer-readable media of claim 11, wherein the program code further comprises instructions to input, into the ensemble of the attention mechanism and the autoencoder, indications of a plurality of intervening telemetry values occurring after the first outlier and before the second outlier.

13. The one or more non-transitory computer-readable media of claim 11, wherein the instructions to determine whether the loss function value output from the autoencoder based on input to the ensemble satisfies the first criterion comprise instructions to determine that the loss function value exceeds the threshold loss function value.

14. The one or more non-transitory computer-readable media of claim 11, wherein the program code further comprises instructions to generate a causality chain for at least the plurality of telemetry metrics based, at least in part, on indications of the causal link between the first telemetry value and the second outlier.

15. An apparatus comprising:

a processor; and a computer-readable medium having instructions stored thereon that are executable by the processor to cause the apparatus to, determine, with a set of one or more unsupervised learning models, a plurality of outliers in a first plurality of telemetry events across a plurality of telemetry metrics for computing resources;

input a plurality of event indications into an ensemble of an attention mechanism and an autoencoder, wherein the plurality of event indications at least include indications of a first outlier of the plurality of outliers and a second outlier of the plurality of outliers that occurs after the first outlier, and wherein the first outlier is of a first telemetry metric of the plurality of telemetry metrics and the second outlier is of a second telemetry metric of the plurality of telemetry metrics;

determine that a loss function value for the ensemble of the attention mechanism and the autoencoder on the input of the plurality of event indications satisfies a first criterion based on a threshold loss function value;

based on determining that the loss function value satisfies the first criterion, determine which of a set of one or more values output by a first internal layer of the attention mechanism satisfies a second criterion, wherein the second criterion comprises a criterion that a value output by the first internal layer at least one of exceeds one or more threshold values and exceeds a threshold percentile of values observed at one or more internal layers of the attention mechanism including the first internal layer; and based on determining that a first value of the set of one or more values at the first internal layer corresponding to a first telemetry event of the first telemetry metric satisfies the second criterion, indicate the first telemetry event of the first telemetry metric as causing the second outlier.

16. The apparatus of claim 15, wherein each of the plurality of telemetry metrics for the computing resources corresponds to one or more telemetry metric values and one or more corresponding time stamps.

17. The apparatus of claim 15, further comprising:

based on determining that the loss function value satisfies the first criterion, determining which of a set of one or more values at a plurality of layers of the attention mechanism satisfies the second criterion; and based on a second telemetry event of the first telemetry metric corresponding to a second value of the set of one or more values at the plurality of layers that satisfies the second criterion, wherein the second value corresponds to a second telemetry event of the first telemetry metric, indicating the second telemetry event of the first telemetry metric as causing the second outlier.

18. The method of claim 1, wherein the first internal layer comprises at least one of a mask layer and a softmax layer that focuses attention of the attention mechanism on one or more sections of the plurality of event indications that at least correspond to the first telemetry event.

19. The one or more non-transitory computer-readable media of claim 11, wherein the first internal layer comprises at least one of a mask layer and a softmax layer that focuses attention of the attention mechanism on one or more sections of the input to the ensemble of the attention mechanism and the autoencoder that at least correspond to the first telemetry value.

20. The apparatus of claim 15, wherein the first internal layer comprises at least one of a mask layer and a softmax layer that focuses attention of the attention mechanism on one or more sections of the plurality of event indications that at least correspond to the first telemetry event.

* * * * *